United States Patent
Chandrashekhara et al.

(10) Patent No.: US 12,346,435 B2
(45) Date of Patent: Jul. 1, 2025

(54) DATA PROTECTION BY DELAYED ORDERED WRITE DESTAGE OPERATIONS

(71) Applicant: Dell Products, L.P., Hopkinton, MA (US)

(72) Inventors: Sandeep Chandrashekhara, Shrewsbury, MA (US); Ramesh Doddaiah, Westborough, MA (US); Mohammed Asher Vt, Bangalore (IN)

(73) Assignee: Dell Products, L.P., Hopkinton, MA (US)

( * ) Notice: Subject to any disclaimer, the term of this patent is extended or adjusted under 35 U.S.C. 154(b) by 258 days.

(21) Appl. No.: 18/295,877

(22) Filed: Apr. 5, 2023

(65) Prior Publication Data

US 2024/0338437 A1   Oct. 10, 2024

(51) Int. Cl.
*G06F 21/55* (2013.01)
*G06F 21/56* (2013.01)

(52) U.S. Cl.
CPC .......... *G06F 21/554* (2013.01); *G06F 21/566* (2013.01)

(58) Field of Classification Search
CPC ........ G06F 21/554; G06F 21/54; G06F 21/55; G06F 21/52; G06F 21/50; G06F 2212/1052; G06F 21/566; G06F 2212/60; G06F 21/56; G06F 21/552
See application file for complete search history.

(56) References Cited

U.S. PATENT DOCUMENTS

| | | | | |
|---|---|---|---|---|
| 4,875,155 A | * | 10/1989 | Iskiyan | G06F 12/0866 711/E12.04 |
| 10,445,497 B2 | * | 10/2019 | Borlick | G06F 21/562 |
| 2004/0250029 A1 | * | 12/2004 | Ji | G06F 11/2082 714/E11.107 |
| 2018/0322280 A1 | * | 11/2018 | Borlick | G06F 21/566 |
| 2020/0089884 A1 | * | 3/2020 | Winokur | G06F 21/566 |
| 2023/0141909 A1 | * | 5/2023 | Truscott | H04L 63/02 726/23 |

FOREIGN PATENT DOCUMENTS

WO   WO-2008093961 A1 * 8/2008 ......... G06F 12/0246

\* cited by examiner

*Primary Examiner* — Alexander Lagor
*Assistant Examiner* — Brandon Binczak
(74) *Attorney, Agent, or Firm* — Anderson Gorecki LLP

(57) ABSTRACT

Host IO write operations on a given storage group are grouped into cycles of a write destage pipeline for the storage group. Host writes are collected during a capture cycle, while host writes from a previous capture cycle are analyzed and destaged during an apply cycle. After the previous apply cycle has completed, a cycle switch occurs and the current capture cycle becomes the new apply cycle. Anomaly detection is implemented before any IO write operations are destaged during the apply cycle, and if an anomaly is detected the write destage is stopped. The entire apply cycle is either destaged to disk, or is discarded, depending on whether the anomaly is confirmed. By maintaining the order of writes across different cycles, which act as consistency points, it is possible to implement ransomware protection in real time on host write operations, while using ordered write destage to maintain data consistency.

17 Claims, 7 Drawing Sheets

(Host write)

(Cycle Switch)

(Anomaly:No)

(Anomaly:Yes)

T1: Cycle switch between capture and apply cycle
W: Anomaly detection time window
T2: Destage start time for apply cycle → T2=T1+W
D: Period of time for destage operations to complete (variable time window based on number of destage operations and speed of backend storage resources)
T3: Destage completion time → T3=T2+D
Cycle N (Apply) Duration: W+D

DATA PROTECTION BY DELAYED ORDERED WRITE DESTAGE OPERATIONS

FIELD

This disclosure relates to computing systems and related devices and methods, and, more particularly, to data protection by delayed ordered write destage operations.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

According to some embodiments, ransomware activity detection and data protection is implemented using delayed ordered write destage operations. Write operations are processed using a write destage pipeline, that implements successive capture and apply cycles. Host IO write operations are collected during a current capture cycle. Host IO write operations that are collected during the current capture cycle are not destaged to disk during the current capture cycle. At the end of the current capture cycle, the current capture cycle becomes a current apply cycle, and subsequent host IO write operations are collected into the next capture cycle. During the current apply cycle, anomaly detection is implemented on the write operations during a first time period. For example, in some embodiments a ransomware protection system is used to analyze the write operations to detect anomalous writes that may indicate the possibility of a ransomware attack. If no write anomalies are detected during the first part of the apply cycle, the write operations are destaged to disk during a second part of the apply cycle. Once all write operations of the current apply cycle have been destaged to disk, the cycle switch occurs again, and the subsequent capture cycle becomes the current apply cycle. In instances where an anomaly is detected, all write operations in the apply cycle and the current capture cycle are discarded, thus protecting the data on disk from anomalous write operations. In instances where the anomalous write operations are associated with ransomware, implementing a delayed ordered write destage enables real-time ransomware detection to protect data stored in back-end storage resources of the storage system against the ransomware attack. In instances where the anomalous writes are not detected, the implementation of ordered writes across cycles ensures that the data stored in back-end storage resources is consistent at consistency points associated with cycle switch events.

In some embodiments, a method of data protection by delayed ordered write destage operations includes implementing a write destage pipeline by creating batches of host IO write operations, each batch of host IO write operations being captured during a capture cycle of the write destage pipeline and subsequently processed to be destaged during an apply cycle of the write destage pipeline, capturing host IO write operations during a current capture cycle, the capture cycle having a duration equal to a duration of a current apply cycle, the current apply cycle containing a set of previous host IO write operations that were captured during a previous capture cycle, and performing anomaly detection on the set of previous host IO write operations during a first portion of the current apply cycle to determine whether any host IO write operation of the set of previous host IO write operations is anomalous. In response to a determination that none of the host IO write operations of the set of previous host IO write operations is anomalous, destaging the set of previous host IO write operations to back-end storage resources, ending the current apply cycle after all of the host IO write operations have been destaged to back-end storage resources, and implementing a cycle switch in the write destage pipeline to cause the current capture cycle to become the current apply cycle. In response to a determination that one or more of the host IO write operations of the set of previous host IO write operations is anomalous, not destaging the host IO write operations of the set of previous host IO write operations to back-end storage resources and generating a ransomware activity alert.

In some embodiments, the method also includes receiving a response to the ransomware activity alert confirming that the one or more of the host IO write operations of the set of previous host IO write operations that was determined to be anomalous is associated with a ransomware attack, and not destaging any of the host IO write operations of the write destage pipeline. In some embodiments, not destaging any of the host IO write operations of the write destage pipeline includes discarding all host IO write operations in both the current capture cycle and the current apply cycle of the pipeline. In some embodiments, the method also includes instructing a host to replay all of the discarded host IO write operations.

In some embodiments, the method also includes receiving a response to the ransomware activity alert confirming that the one or more of the host IO write operations of the set of previous host IO write operations that was determined to be anomalous is not associated with a ransomware attack, and resuming apply cycle processing, including destaging the set of previous host IO write operations to back-end storage resources, ending the current apply cycle after all of the host IO write operations have been destaged to back-end storage resources, and implementing a cycle switch in the write destage pipeline to cause the current capture cycle to become the current apply cycle.

In some embodiments implementing a write destage pipeline includes implementing a plurality of separate write destage pipelines, each write destage pipeline processing host IO write operations on a separate storage group of storage volumes. In some embodiments the plurality of separate write destage pipelines execute asynchronously relative to each other.

In some embodiments, the method also includes receiving a host IO read operation, determining that a first version of the data requested in the host IO read operation resides in back-end storage resources, that a second version of the data requested in the host IO read operation resides in a first slot of global memory referenced by a host IO write operation in the current apply cycle, and that a third version of the data requested in the host IO read operation resides in a second slot of global memory referenced by a host IO write operation in the current apply cycle. The method also includes retrieving the first version of the data requested in the host IO read operation from the back-end storage resources, merging the second version of the data requested in the host IO read operation with the first version of the data to create a first merged version of the data, and merging the third version of the data requested in the host IO read operation with the first merged version of the data to create a second merged version of the data to be sent to the host in response to the host IO read operation.

In some embodiments, a duration of the first portion of the current apply cycle is sufficiently long to enable anomaly detection to be completed on all host IO write operations of the set of previous host IO write operations before destaging any host IO write operations of the set of previous host IO write operations to back-end storage resources.

In some embodiments, the method also includes starting anomaly detection processing on at least a portion of the set of previous host IO write operations of the current apply cycle during a previous capture cycle.

In some embodiments, a system for data protection by delayed ordered write destage operations, includes one or more processors and one or more storage devices storing instructions that are operable, when executed by the one or more processors, to cause the one or more processors to perform operations including implementing a write destage pipeline by creating batches of IO write operations, each batch of host IO write operations being captured during a capture cycle of the write destage pipeline and subsequently processed to be destaged during an apply cycle of the write destage pipeline, capturing host IO write operations during a current capture cycle, the capture cycle having a duration equal to a duration of a current apply cycle, the current apply cycle containing a set of previous host IO write operations that were captured during a previous capture cycle, and performing anomaly detection on the set of previous host IO write operations during a first portion of the current apply cycle to determine whether any host IO write operation of the set of previous host IO write operations is anomalous. In response to a determination that none of the host IO write operations of the set of previous host IO write operations is anomalous, destaging the set of previous host IO write operations to back-end storage resources, ending the current apply cycle after all of the host IO write operations have been destaged to back-end storage resources, and implementing a cycle switch in the write destage pipeline to cause the current capture cycle to become the current apply cycle. In response to a determination that one or more of the host IO write operations of the set of previous host IO write operations is anomalous, not destaging the host IO write operations of the set of previous host IO write operations to back-end storage resources and generating a ransomware activity alert.

In some embodiments, the instructions are further operable, when executed by the one or more processors, to cause the one or more processors to perform operations including receiving a response to the ransomware activity alert confirming that the one or more of the host IO write operations of the set of previous host IO write operations that was determined to be anomalous is associated with a ransomware attack, and not destaging any of the host IO write operations of the write destage pipeline. In some embodiments, not destaging any of the host IO write operations of the write destage pipeline includes discarding all host IO write operations in both the current capture cycle and the current apply cycle of the pipeline. In some embodiments, the instructions are further operable, when executed by the one or more processors, to cause the one or more processors to perform operations including instructing a host to replay all of the discarded host IO write operations.

In some embodiments, the instructions are further operable, when executed by the one or more processors, to cause the one or more processors to perform operations including receiving a response to the ransomware activity alert confirming that the one or more of the host IO write operations of the set of previous host IO write operations that was determined to be anomalous is not associated with a ransomware attack, and resuming apply cycle processing, including destaging the set of previous host IO write operations to back-end storage resources, ending the current apply cycle after all of the host IO write operations have been destaged to back-end storage resources, and implementing a cycle switch in the write destage pipeline to cause the current capture cycle to become the current apply cycle.

In some embodiments, implementing a write destage pipeline includes implementing a plurality of separate write destage pipelines, each write destage pipeline processing host IO write operations on a separate storage group of storage volumes. In some embodiments, the plurality of separate write destage pipelines execute asynchronously relative to each other.

In some embodiments, the instructions are further operable, when executed by the one or more processors, to cause the one or more processors to perform operations including receiving a host IO read operation, and determining that a first version of the data requested in the host IO read operation resides in back-end storage resources, that a second version of the data requested in the host IO read operation resides in a first slot of global memory referenced by a host IO write operation in the current apply cycle, and that a third version of the data requested in the host IO read operation resides in a second slot of global memory referenced by a host IO write operation in the current apply cycle. The instructions are further operable, when executed by the one or more processors, to cause the one or more processors to perform operations including retrieving the first version of the data requested in the host IO read operation from the back-end storage resources, merging the second version of the data requested in the host IO read operation with the first version of the data to create a first merged version of the data, and merging the third version of the data requested in the host IO read operation with the first merged version of the data to create a second merged version of the data to be sent to the host in response to the host IO read operation.

In some embodiments, a duration of the first portion of the current apply cycle is sufficiently long to enable anomaly detection to be completed on all host IO write operations of the set of previous host IO write operations before destaging any host IO write operations of the set of previous host IO write operations to back-end storage resources.

In some embodiments, the instructions are further operable, when executed by the one or more processors, to cause the one or more processors to perform operations including starting anomaly detection processing on at least a portion of the set of previous host IO write operations of the current apply cycle during a previous capture cycle.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
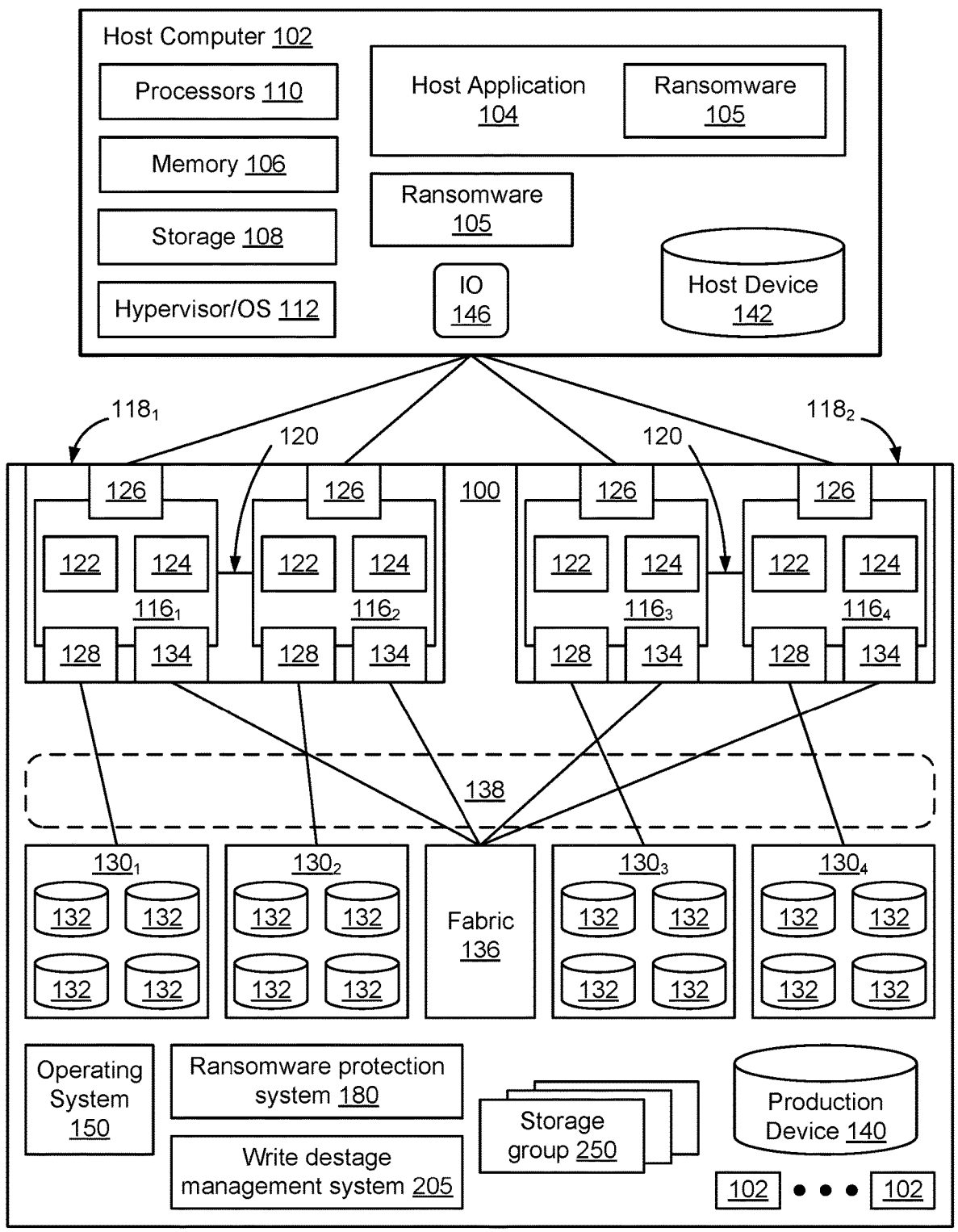
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. In some embodiments, the communication links 120 are implemented as a PCIe NTB. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using PCIe (Peripheral Component Interconnect Express) or InfiniBand. Each compute node 116 may allocate a portion or partition of its respective local volatile memory 124 to a virtual shared memory 138 that can be accessed by other compute nodes 116 over the PCIe NTB links.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible, then the IO 146 is sent to one of the compute nodes 116 to be serviced by the storage system 100.

In the case where IO 146 is a read command, the storage system 100 uses metadata to locate the commanded data, e.g., in the virtual shared memory 138 or on managed drives 132. If the commanded data is not in the virtual shared memory 138, then the data is temporarily copied into the virtual shared memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared memory 138, marks the data as dirty, and creates new metadata that maps the address of the data on the production device 140 to a location to which the block is written on the managed drives 132.

As shown in FIG. 1, in some instances a host application 104 will become infected by ransomware 105. In other instances, the ransomware 105 will be a separate application on the host computer 102. In other instances, the ransomware 105 may exist on a separate computer or on the storage system 100. Regardless of the origin of the attack, ransomware 105 will often operate to encrypt data stored on a storage volume such as the production device 140, to prevent the host application 104 from accessing the data stored on storage volume. To encrypt the data stored on storage volume, the ransomware 105 typically will read the data from the storage volume, run an encryption algorithm on the data, and then write the data back to the storage volume. Once the data has been encrypted, when the host application 104 issues a read operation on host device 142, the data that is returned by the storage system 100 will be encrypted with an encryption key used by the ransomware 105, such that the host application 104 is not able to decipher the data that was returned by the storage system 100.

To recover the original data, the host application 104 will need to access a different copy of the data, such as a backup copy, to enable the host application to resume operation. Depending on the type of attack, for example if the ransomware 105 has not been removed from the host 102, accessing the backup copy of the data can cause the backup copy to also be affected by the ransomware attack. One way to resolve the ransomware attack is for the host 102 to obtain access to a decryption key, to enable the host 102 to decrypt the data stored in storage volume, but this resolution is often undesirable since it often involves payment of money to the person who initiated the ransomware attack.

To minimize the amount of data affected by a ransomware attack, it is possible to implement ransomware detection on the storage array. An example of this type of ransomware detection system is described in greater detail in U.S. patent application Ser. No. 17/578,574, entitled Method and Apparatus for Detecting the Occurrence of a Ransomware Attack on a Storage Volume, filed Jan. 19, 2022, the content of which is hereby incorporated herein by reference. Other ways of detecting host IO write anomalies potentially indicative of occurrence of a ransomware attack may be utilized as well, depending on the implementation. According to some embodiments, a write destage management system is provided that enables data protection to be implemented on back-end storage resources 130, while maintaining the order of host IO write operations on back-end storage resources using delayed ordered write destage operations.

Figure 2:
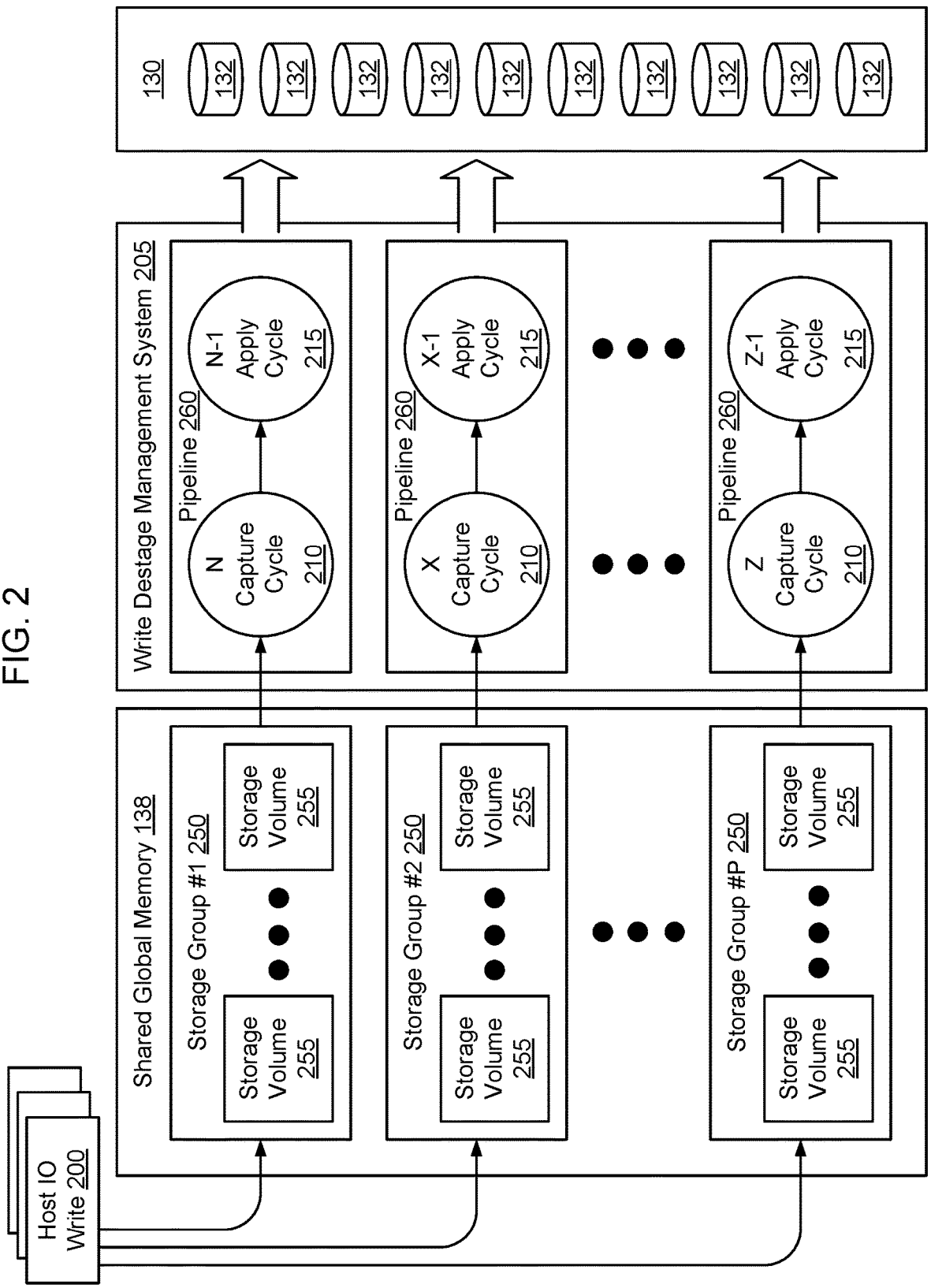
FIG. 2 is a block diagram illustrating application of host IO write operations to a set of storage groups, and utilizing a write destage management system to implement data protection by delayed ordered write destage operations, according to some embodiments.

FIG. 2 is a block diagram illustrating application of host IO write operations 200 to a set of storage groups 250, and utilizing a write destage management system 205 to implement data protection by delayed ordered write destage operations, according to some embodiments. As shown in FIG. 2, in some embodiments hosts 102 implement write operations 200 on storage volumes 255 of storage groups 250. As described above, when a host IO write operation 200 is received on a storage volume 255, the data is stored in one or more slots of shared global memory 138, and is subsequently written out from shared global memory 138 to managed drives 132. As used herein, the term "destaged" is used to refer to the process of moving data from shared global memory 138 to other storage resources such as managed drives 132. Although some embodiments are described in which the data is destaged to managed drives 132, it should be understood that data may likewise be destaged to other storage resources and the invention is not limited to implementations where the data is destaged to managed drives 132. Rather, the invention is focused on the manner in which data is destaged from shared global memory, regardless of the ultimate destination of the data. For convenience, data is described as being destaged to "back-end storage resources", one example of which is which a back-end drive array 130 containing managed drives 132.

Hosts may use multiple storage volumes 255 which are organized using storage groups 250. For example, a given application may use several different storage volumes 255 to store data that is accessed by the application. Likewise, when a host issues a write operation 200 on a first storage volume 255, the host IO write operation 200 may also cause an entry to be written to a second storage volume 255 implementing a transaction log. Accordingly, by organizing the storage volumes 255 into storage groups 250, it is possible to logically organize the storage volumes 255 within the storage system 100.

According to some embodiments, a write destage management system 205 implements a set of write destage pipelines 260. Each write destage pipeline 260 processes host IO write operations 200 on storage volumes 255 of a particular storage group 250 in batches using two cycles-a capture cycle 210 and an apply cycle 215. Host IO write operations 200 are captured into a batch of host IO write operations during the capture cycle 210. Cycle switch events cause the batch of host IO write operations collected in the capture cycle 210 to be moved to the apply cycle 215. Host IO write operations 200 are processed in the apply cycle to determine if any of the host IO write operations 200 is likely associated with a ransomware attack (an anomaly). Once all host IO write operations 200 in the apply cycle 215 are processed by the ransomware protection system 180 and, in the absence of a ransomware attack, destaged to back-end storage resources 130, a subsequent cycle switch event occurs. This iterates to enable the write destage pipeline to continuously capture current of host IO write operations 200 into batches, while processing a previous batch of host IO write operations in the apply cycle 215 and, once the previous batch of host IO write operations 200 has been processed, to move the current batch of host IO write operations from the capture cycle 210 to the apply cycle 215.

For example, as shown in FIG. 2, in some embodiments, each write destage pipeline 260 has a capture cycle 210 and an apply cycle 215. New host IO write operations 200 are added to the capture cycle 210 while host IO write operations in the previous capture cycle are processed in the apply cycle 215. Once the previous host IO write operations are processed in the apply cycle 215, a cycle switch occurs and the current capture cycle becomes the next apply cycle 215. For example, as shown in FIG. 2, the host IO write operations that were captured during capture cycle N−1 are being processed to be destaged in the apply cycle N−1. All host IO write operations that occur while the previous host IO write operations of apply cycle N−1 are being processed are included in capture cycle N. When the write destage pipeline 260 has completed processing of all of the previous host IO write operations of apply cycle N−1, a cycle switch will occur and capture cycle N will become apply cycle N. During apply cycle N, the subsequently received new host IO write operations 200 will form part of capture cycle N+1.

As shown in FIG. 2, in some embodiments the write destage management system 205 implements a separate respective write destage pipeline 260 for each storage group 250. As discussed in greater detail herein, in some embodiments the write destage management system 205 implements anomaly detection on the write operations during the apply cycle 215. After implementing the anomaly detection, in instances where no anomalies are detected, the apply cycle 215 of the destage pipeline 260 implements destage operations to move the data of the host IO write operations from shared global memory 138 to back-end storage resources 130. The amount of time it takes to implement the destage operations may vary, and will depend for example on the amount of data required to be moved from shared global memory 138 to back-end storage resources 130, as well as the speed of the disks 132.

By implementing separate write destage pipelines 260 that are not synchronized, different write destage pipelines 260 will implement cycle switch operations at different times and, accordingly, will asynchronously implement destage operations. This enables the destage operations for different storage groups to be distributed over time to minimize congestion which would otherwise occur if all write destage pipelines 260 attempted to synchronously implement destage write operations from shared global memory 138 to back-end storage resources 130. Although some embodiments are described in which a separate write destage pipeline 260 is implemented for each respective storage group 250, it should be understood that separate write destage pipelines 260 may be used to process write operations for sets of storage groups 250 as well, as long as each set of storage groups 250 contains fewer than all of the storage groups 250 of the storage system 100.

Importantly, in some embodiments each write destage pipeline 260 is configured to not implement any destage operations for write operations that are in the capture cycle 210. Preventing destage of write operations in the capture cycle 210 of the write destage pipeline 260 both ensures the order of the write operations in situations where multiple sequential writes are received in multiple subsequent cycles, as well as ensures that write operations are not destaged to back-end storage resources 130 before anomaly detection is complete, thus protecting the data contained in back-end storage resources 130 against anomalous writes associated with, for example, a ransomware attack.

FIGS. 3A-3D are block diagrams showing the use of delayed ordered write destage operations to protect data stored in back-end storage resources 130 from being affected by anomalous host IO write operations, according to some embodiments. Specifically, FIGS. 3A-3D show an example of how a particular write operation 200 (block W1) is processed by a write destage pipeline 260 of a write destage management system 205.

Figure 3A:
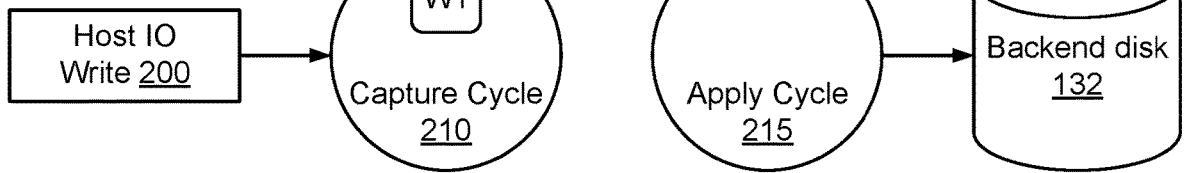
FIGS. 3A-3D are block diagrams showing the use of delayed ordered write destage operations to protect data stored in managed drives from being affected by anomalous host IO write operations, according to some embodiments.
Figure 3B:
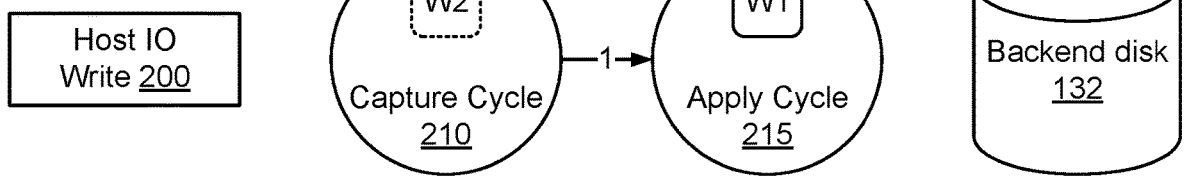

As shown in FIG. 3A, when a host IO write 200 (block W1) is received, data associated with the host IO write 200 is stored in shared global memory 138, and the host IO write operation 200 (block W1) is added to the current capture cycle 210. In some embodiments, each capture cycle is numbered. In the example shown in FIGS. 3A, the current capture cycle is cycle number N. The previous capture cycle was number cycle N−1 which, after a cycle switch, became apply cycle N−1. The next capture cycle, which appears in FIG. 3B, is cycle N+1. In some embodiments, the capture cycle 210 of write destage pipeline 260 is implemented using a list, such that all host IO write operations that are received on storage group 250 between subsequent cycle switches are added to the list. The actual data for each of the host IO write operations is maintained in slots of shared global memory 138, and the list contains information identifying the host IO write operations, such as the identification of the slot where the data of the host IO write operation is located in shared global memory. In some embodiments the list of host IO write operations that occur during the capture cycle 210 is implemented using a linked list, although other data structures may be used to identify host IO write operations that are included in capture cycle 210.

When all host IO write operations have been processed from apply cycle N−1, a cycle switch (arrow 1) occurs, as shown in FIG. 3B. Specifically, as shown in FIG. 3B, all host IO write operations (block W) that were part of capture cycle N are processed during apply cycle N after the cycle switch (arrow 1). Subsequent host IO write operations (FIG. 3B, dashed block W2) that occur after the cycle switch (arrow 1) are added to capture cycle N+1.

Figure 3C:
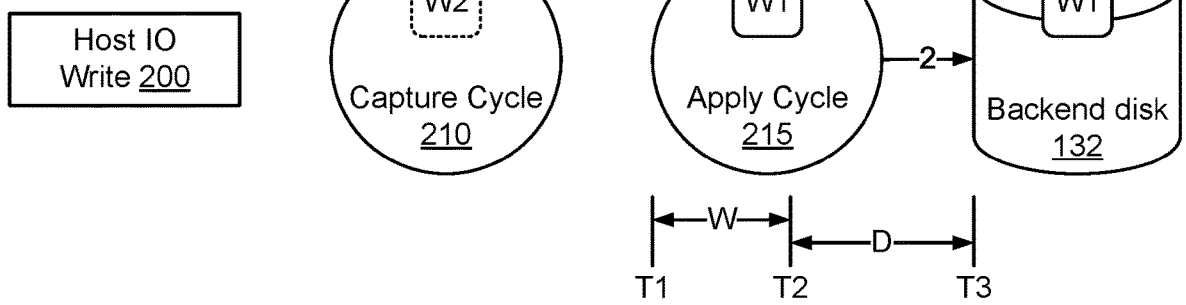
Figure 3D:
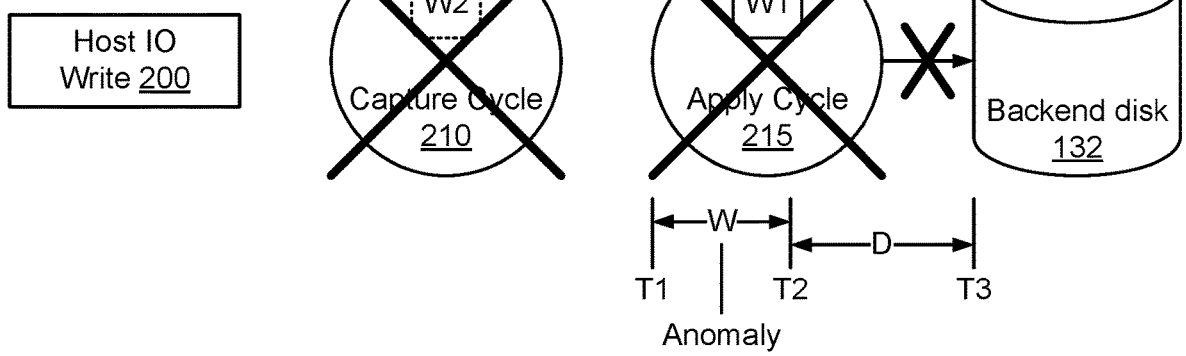

As shown in FIGS. 3C and 3D, during the apply cycle anomaly detection is implemented for a first portion of time W, and if no anomaly is detected, destage operations occur during a second portion of time D (FIG. 3C, arrow 2). If an anomaly is detected (FIG. 3D), the host IO write operations are not destaged to back-end storage resources 130. An alert is generated and, if the anomaly is confirmed, in some embodiments all host IO write operations in the write destage pipeline 260 for the storage group 250 are discarded. Specifically, in instances where the anomaly is confirmed to be associated with a ransomware attack, the host IO write operations in both the apply cycle 215 and the capture cycle 210 are discarded, and the host IO write operations are then replayed by the host on the storage system 100, thus protecting the data contained in back-end storage resources 130. In instances where a response to the alert is received that verifies that the host IO write operations are not associated with ransomware activity, the apply cycle processing continues, for example by continuing anomaly detection processing and destage operations.

Figure 4:
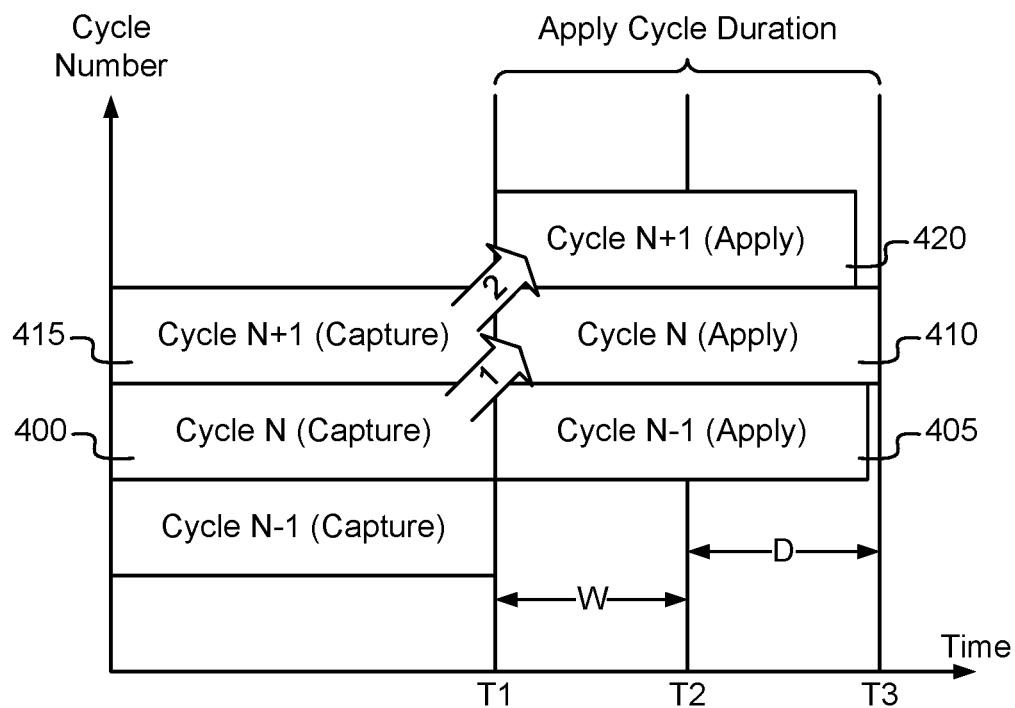
FIG. 4 is a graph showing alternation between capture and apply cycles to implement delayed ordered write destage operations, according to some embodiments.

FIG. 4 is a graph showing alternation between capture and apply cycles to implement delayed ordered write destage operations, according to some embodiments. As shown in FIG. 4, during capture cycle N 400, all write operations on a logical group of storage volumes 255, such as the storage volumes 255 of a storage group 250, are identified and added to a capture cycle N 400. At the end of a previous apply cycle N−1 405, a cycle switch occurs (FIG. 4 arrow 1) and the current capture cycle N 400 becomes the current apply cycle N 410. During apply cycle N 410, new host IO write operations on the set of storage volumes 255 that are received after the cycle switch operation are added to capture cycle N+1 415.

During the apply cycle N 410, anomaly detection is implemented on the write operations before the write operations are destaged to back-end storage resources 130. Specifically, as shown in FIG. 4, at time T1 a cycle switch occurs (FIG. 4 arrow 1) between the capture and apply cycles, such that the capture cycle N 400 becomes apply cycle N 410. At the start of the apply cycle T1, an anomaly detection process is implemented by ransomware protection system 180 during an anomaly detection time window W. It should be noted that anomaly detection processing implemented by ransomware protection system 180 can begin on write operations 200 as soon as the write operations 200 are received at the storage system. Specifically, in some embodiments, anomaly detection is implemented on host IO write operations during both the capture cycle and during the apply cycle. However, since a write operation 200 may be received immediately prior to the time of the cycle switch T1, in some embodiments the anomaly detection time window W is sized to enable anomaly detection to be completed by the ransomware protection system 180 on all write operations during the first portion W of the apply cycle 215.

For example, in some embodiments, anomaly detection takes on the order of several seconds. Accordingly, in some embodiments the anomaly detection time window W is set to be at least several seconds long, and will depend on the amount of time required by ransomware protection system 180 to implement anomaly detection. In some embodiments, the anomaly detection time window W is a user-settable parameter, having a minimum amount of time set based on an amount of time required by ransomware protection system 180 to implement anomaly detection. For example, if the ransomware protection system 180 requires at least 3 seconds to implement anomaly detection, a user may be provided with an option to set the duration of the anomaly detection time window W to a value ranging, for example between 3 and 10 seconds.

In some embodiments, a user might select a relatively long period of time relative to the amount of time required to implement anomaly detection. For example, a user might elect to set W=10 seconds, whereas anomaly detection only requires on the order of 3 seconds to complete. Setting the wait period to a higher value ensures that anomaly detection is able to be completed and can provide additional insurance against a ransomware attack by delaying destaging of host IO write operations to back-end storage resources 130. However, setting W to a higher value (longer duration) will require the host IO write operations to be stored in shared global memory 138 for a longer period of time, which can affect other performance aspects of storage system 100. According to some embodiments, if overall demands on the storage system are high, such as in periods of high host IO volume, the write destage management system 205 temporarily lowers the values of W to shorten the wait period and, accordingly, reduces the amount of capacity of shared global memory utilized by the apply cycles. However, since one of the signatures of a ransomware attack is an increased IO volume on a particular storage volume, in some embodiments the value of W is not shortened for the write destage pipeline 260 associated with the storage group 250 if the workload volume on the storage group 250 is high relative to the workload volumes of other storage groups 250 or is high relative to the historic workload on the storage group 250.

After expiration of the anomaly detection time window W, at time T2 destage operations commence. Time T2 thus is equal to time T1 plus the anomaly detection time window W. Destage operations occur for a period of time D, which is a variable amount of time that will depend on the number of destage operations that are required to be implemented and the speed of the drives 132 of back-end storage resources 130. Once all write operations have destaged, at time T3=T2+D, cycle N apply cycle 410 ends. The end of the previous apply cycle is a trigger event that causes the pipeline 260 to implement a cycle switch operation, such that capture cycle N+1 415 becomes apply cycle N+1 420 (FIG. 4, arrow 2).

Figure 5:
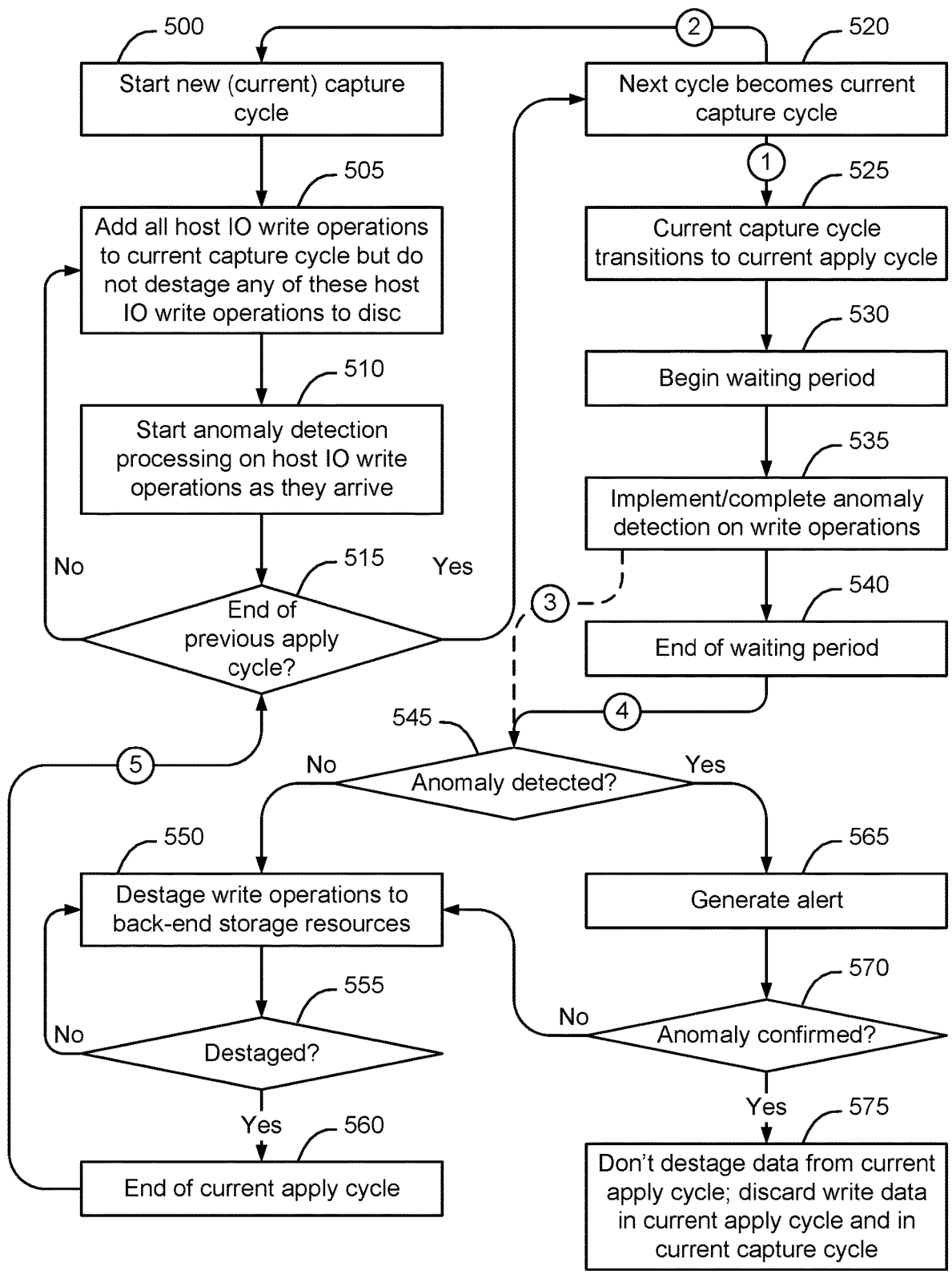
FIG. 5 is a flowchart of a method of implementing data protection by delayed ordered write destage operations, according to some embodiments.

FIG. 5 is a flowchart of a method of implementing data protection by delayed ordered write destage operations, according to some embodiments. As shown in FIG. 5, in some embodiments after a new, current, capture cycle starts (block 500), all host IO write operations are added to the current capture cycle (block 505). Optionally, anomaly detection can be started on the host IO write operations as they are received (block 510). Alternatively, anomaly detection can be implemented only after the end of the current capture cycle depending on the implementation. Destage operations do not occur on any host IO write operations while the host IO write operations 200 are part of the current capture cycle (block 505).

A determination is then made if the end of the previous apply cycle has occurred (block 515). In response to a determination that the previous apply cycle has not ended (a determination of NO at block 515), host IO write operations 200 on the set of storage volumes 255 of the storage group 250 continue to be added to the current capture cycle (block 505). In response to a determination that the previous apply cycle has ended (a determination of YES at block 515) the next cycle becomes the current capture cycle (block 520) and subsequent host IO write operations 200 will be added to the next capture cycle (arrow 2, block 500). Additionally, the current capture cycle transitions to the current apply cycle in connection with a cycle switch operation (arrow 1, block 525).

When the current capture cycle becomes the current apply cycle, a waiting period begins (block 530) during which anomaly detection is completed (block 535). In some embodiments, anomaly detection is started on host IO write operations as they arrive (block 510). In other embodiments, anomaly detection is started on the host IO write operations during the waiting period (block 535). The particular manner in which the anomaly detection is initiated or implemented will depend on the particular implementation. In some embodiments, the duration of the waiting period is set to enable anomaly detection to be completed prior to destaging any of the host IO write operations to back-end storage resources 130.

A determination is made as to whether an anomaly is detected (block 545). A detected anomaly alert may occur during the anomaly detection process (block 535, arrow 3) or may occur at the end of the waiting period (block 540, arrow 4). In response to a determination that an anomaly has not been detected (a determination of NO at block 545), the host IO write operations of the apply cycle 215 are destaged from shared global memory 138 to back-end storage resources 130 (block 550). A determination is made as to whether all host IO write operations have been destaged (block 555). While there are more host IO write operations of the current apply cycle to be destaged (a determination of NO at block 555) the destage operations continue (block 550). Once all host IO write operations of the current apply cycle have been destaged (a determination of YES at block 555), the current apply cycle ends (block 560), which triggers a cycle switch operation to transition the next capture cycle into the next apply cycle (arrow 5, which causes a determination of YES at block 515).

In response to a determination that an anomaly has been detected (a determination of YES at block 545), the host IO write operations of the apply cycle 215 are not destaged from shared global memory 138 to back-end storage resources 130 and an alert is generated (block 565). It is possible for a ransomware protection system 180 to interpret legitimate read/write patterns as potential ransomware attacks. Accordingly, not all anomalies detected by the ransomware protection system 180 are necessarily associated with a ransomware attack. By generating an alert (block 565) a storage administrator has the opportunity to evaluate whether the anomaly is a true anomaly, or whether the anomaly is a false positive. Accordingly, in some embodiments when an anomaly alert is generated (block 565) an opportunity is provided for the anomaly to be confirmed (block 570). In instances where feedback is received that indicates that an anomaly is not present (a determination of NO at block 570), destage operations are implemented on the host IO write operations of the current apply cycle 215 (block 555). In instances where feedback is received that indicates that an anomaly is present (a determination of YES at block 570), destage operations are not implemented on the host IO write operations (block 575). In some embodiments, data from both the current apply cycle and the current capture cycle are discarded (for example as shown in FIG. 3D). Discarding the anomalous write operations prevents the good data stored in back-end storage resources 130 from being affected by the anomalous writes. The transactions reflected in the discarded host IO write operations may then replayed by the host once the ransomware 105 has been neutralized.

Host Read Operations

It is possible for two write operations to subsequently occur on the same piece of data. If both write operations are implemented during the same capture cycle, the write operations will be merged in shared global memory 138 such that the capture cycle 210 will include a single host IO write operation that is to be destaged to back-end storage resources 130 during the next apply cycle. If two write operations occur on the same piece of data in different capture cycles, the separate write operations will be separately destaged during separate apply cycles 215. By ensuring that all write operations 200 of a given apply cycle are processed and destaged to back-end storage resources 130 prior to implementing a cycle switch, it is possible to guarantee that the order in which the write operations are applied to the data in back-end storage resources is consistent with the order in which the write operations were received, thus enabling multiple versions of the same data to be maintained in shared global memory while ensuring that the merge operations occur in the intended order when the data is destaged to back-end storage resources 130.

When a host IO read operation occurs, the fact that there are potentially multiple copies of the requested data in shared global memory 138, as well as a version of the requested data in back-end storage resources 130, complicates the manner in which the storage system is required to respond to the host IO read operations.

Figure 6:
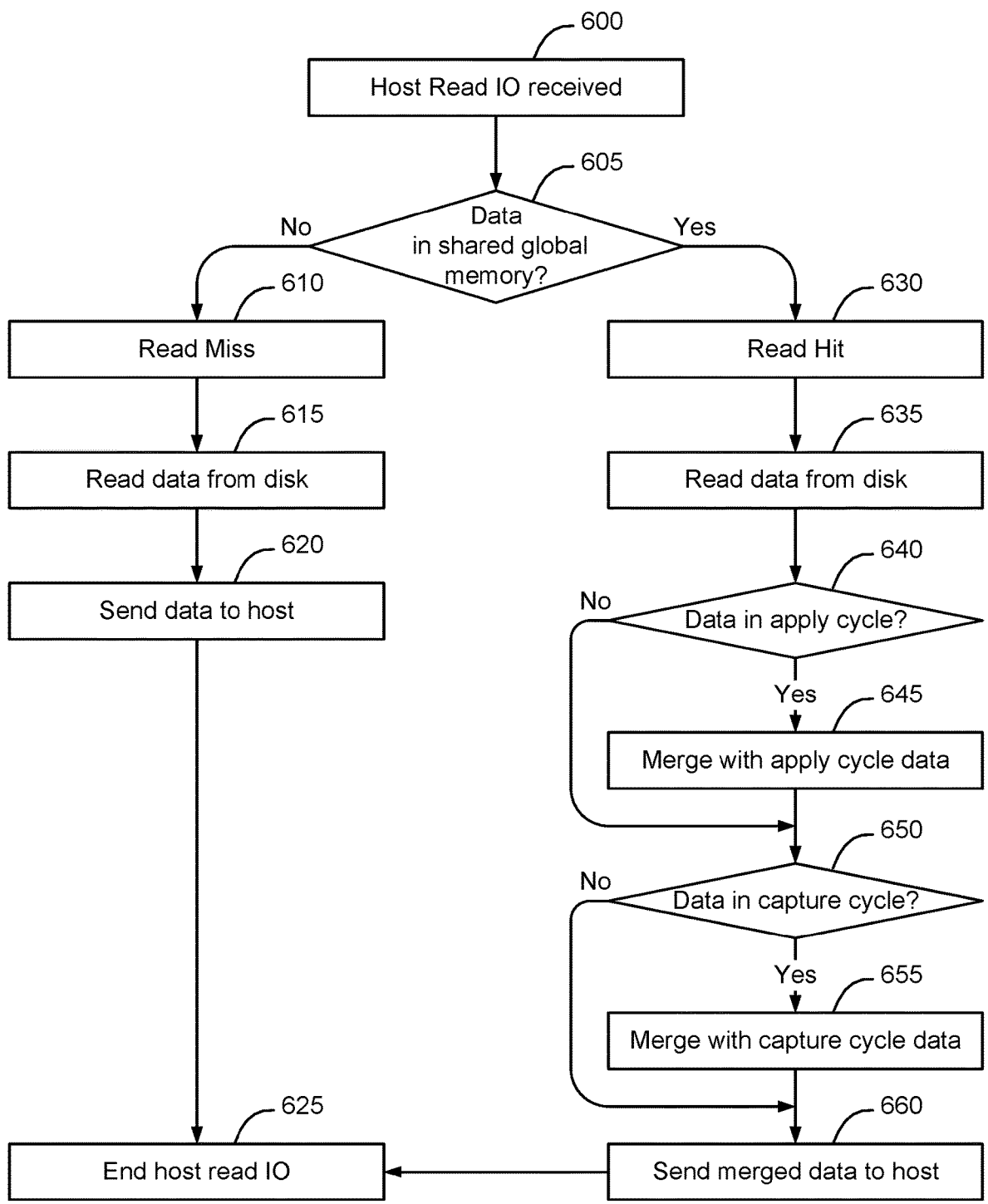
FIG. 6 is a flowchart of a method of implementing a read operation in a storage system configured to implement data protection by delayed ordered write destage operations, according to some embodiments.

FIG. 6 is a flowchart of a method of implementing a read operation in a storage system configured to implement data protection by delayed ordered write destage operations, according to some embodiments. FIGS. 7A-7D are graphical representations of several possible data merge operations implemented using the process shown in FIG. 6 in a storage system configured to implement data protection by delayed ordered write destage operations, according to some embodiments.

As shown in FIGS. 7A-7D, in response to a host IO read operation, data is merged from oldest to newest, prior to providing the data to the host. Specifically, as shown in FIGS. 7A-7D, in some embodiments the requested host data (blocks 1, 2, and 3) may reside on disk (oldest data=block 1), may reside in a slot of global memory that is associated with a write operation that is part of the current apply cycle 215 (second oldest data=block 2), and may reside in a slot of global memory that is associated with a write operation that is part of the current capture cycle 210 (newest data=block 3). By merging the data from oldest to newest, it is possible to create a version of the requested data based on the ordered writes even while multiple versions of the requested data are pending destage in shared global memory 138.

Figure 7A:
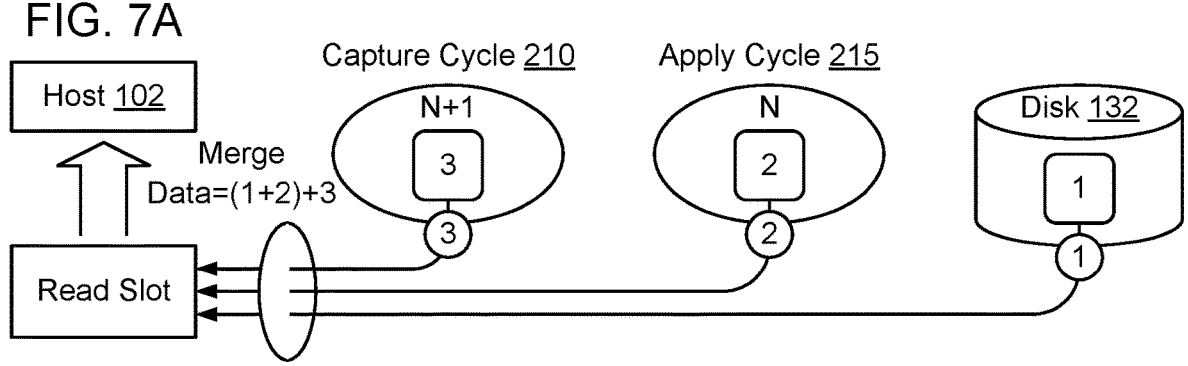
FIGS. 7A-7D are graphical representations of several possible data merge operations implemented using the process shown in FIG. 6 in a storage system configured to implement data protection by delayed ordered write destage operations, according to some embodiments.

For example, FIG. 7A shows an example where versions of the requested data are contained on disk 132 (block 1), in a slot of shared global memory associated with a write operation that is part of the current apply cycle N (block 2), and in a slot of shared global memory associated with a write operation that is part of the current capture cycle N+1 (block 3). As shown in FIG. 7A, a data merge operation is implemented to first merge data from disk and data from the slot of shared global memory associated with a write operation that is part of the current apply cycle N (merge arrows 1 and 2), and then a second data merge operation is implemented to merge the data from the slot of shared global memory associated with a write operation that is part of the current capture cycle N+1 with the previously merged data: Data=

(1+2)+3. The merged data is then stored in a slot of shared global memory to be read out to the host.

Figure 7B:
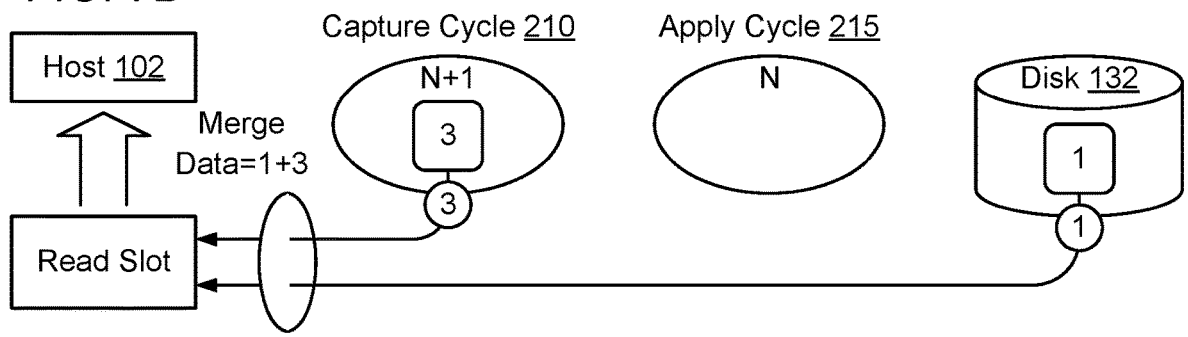

FIG. 7B shows an example where two versions of the requested data are contained on disk 132, and in a slot of shared global memory associated with a write operation that is part of the current capture cycle N+1. As shown in FIG. 7B, a data merge operation is implemented to merge data from disk with the data from the slot of shared global memory associated with a write operation that is part of the current capture cycle N+1 (merge arrows 1 and 3): Data=1+3. The merged data is then stored in a slot of shared global memory to be read out to the host.

Figure 7C:
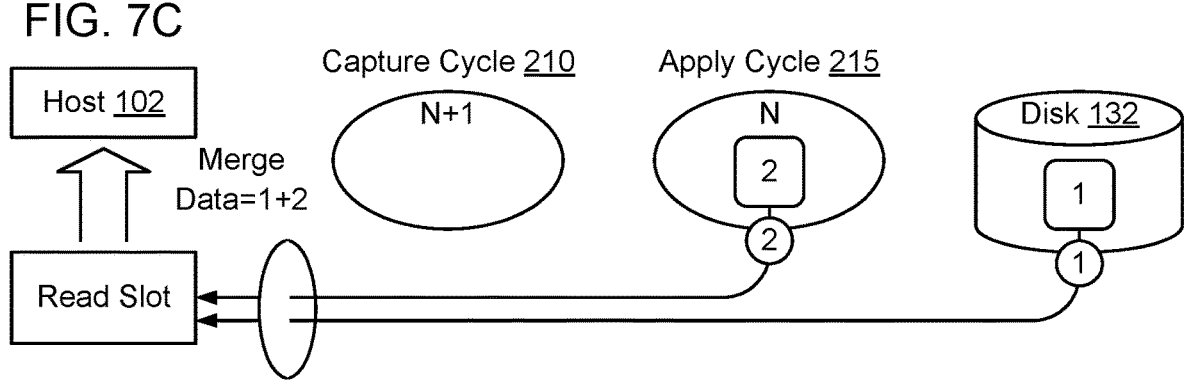

FIG. 7C shows an example where two versions of the requested data are contained on disk 132, and in a slot of shared global memory associated with a write operation that is part of the current apply cycle N. As shown in FIG. 7C, a data merge operation is implemented to merge data from disk with the data from the slot of shared global memory associated with a write operation that is part of the current apply cycle N (merge arrows 1 and 2): Data=1+2. The merged data is then stored in a slot of shared global memory to be read out to the host.

Figure 7D:
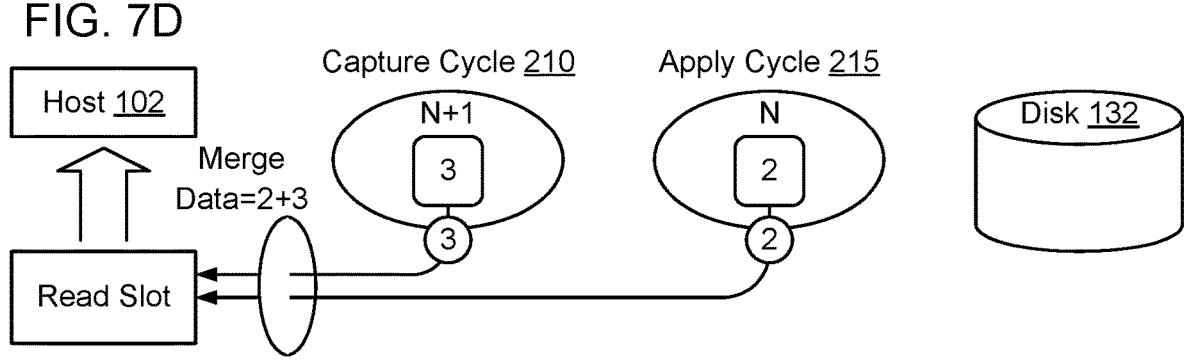

FIG. 7D shows an example where two versions of the requested data are contained in a slot of shared global memory associated with a write operation that is part of the current capture cycle N+1, and in a slot of shared global memory associated with a write operation that is part of the current apply cycle N. As shown in FIG. 7C, a data merge operation is implemented to merge data from the slot of shared global memory associated with a write operation that is part of the current apply cycle N, with the version of the data that is contained in the slot of shared global memory associated with a write operation that is part of the current capture cycle N+1, (merge arrows 2 and 3): Data=2+3. The merged data is then stored in a slot of shared global memory to be read out to the host.

Referring now to FIG. 6, as shown in FIG. 6, when a host IO read operation is received (block 600), a determination is made as to whether the requested data is contained in shared global memory (block 605). In response to a determination that the requested data is not contained in shared global memory (a determination of NO at block 605), the host IO read operation is a read miss (block 610). The requested data is read from disk (block 615), sent to the host (block 620), and the host IO read operation ends (block 625).

In response to a determination that at least a portion of the requested data is contained in shared global memory (a determination of YES at block 605), the host IO read operation is a read hit (block 630). The version of the requested data is read from disk (block 635) and a determination is made as to whether a version of the requested data is contained in a slot of shared global memory that is associated with a host IO write operation that is contained in the current apply cycle (block 640). In response to a determination that a version of the requested data is contained in a slot of shared global memory that is associated with a host IO write operation that is contained in the current apply cycle (a determination of YES at block 640), the version of the data from disk is merged with the version of the data referenced in the apply cycle (block 645).

In response to a determination that a version of the requested data is not contained in a slot of shared global memory that is associated with a host IO write operation that is contained in the current apply cycle (a determination of NO at block 640), or after merging the version of the data from disk with the version of the data of the apply cycle (block 645), a determination is made as to whether a version of the requested data is contained in a slot of shared global memory that is associated with a host IO write operation that is contained in the current capture cycle (block 650). In response to a determination that a version of the requested data is not contained in a slot of shared global memory that is associated with a host IO write operation that is contained in the current capture cycle (a determination of NO at block 650), the merged data is sent to the host (block 660) and the host IO read operation ends (block 625).

In response to a determination that a version of the requested data is contained in a slot of shared global memory that is associated with a host IO write operation that is contained in the current capture cycle (a determination of YES at block 650), the previously merged version of the data or the version of the data from disk is merged with the version of the data referenced in the capture cycle (block 655). The merged data is then sent to the host (block 660), and the host IO read operation ends (block 625).

By grouping host IO write operations into cycles of a write destage pipeline 260, it is possible for host IO write operations for each track to be collected in cache slots in a list within a bucket with a cycle number. Any new host IO write operations to a track are collected during the capture cycle, while all writes from the previous capture cycle are destaged to disk. After the previous apply cycle has completed, a cycle switch occurs and the current capture cycle becomes the new apply cycle. Anomaly detection is implemented before any host IO write operations are destaged during the apply cycle, and if an anomaly is detected the write destage operations are prevented. The entire apply cycle is either destaged to disk, or is discarded, depending on whether the anomaly is confirmed. By maintaining the order of writes across different cycles, which act as consistency points, it is possible to implement ransomware protection in real time on host IO write operations, while using ordered write destage operations to protect good data on disk, and maintain data consistency. By implementing the anomaly protection at the storage group level, it is possible to prevent false positive anomaly identifications, or actual ransomware activity, from affecting the entire storage system.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of data protection by delayed ordered write destage operations, comprising:
   receiving host write Input/Output (IO) operations;
   allocating a respective slot of shared global memory for each received host write IO operation and temporarily storing data of each respective host write IO operation in the respective allocated slot of shared global memory; and
   implementing a set of write destage pipelines, each respective write destage pipeline being implemented for a respective set of related storage volumes of a given storage group, and each write destage pipeline being configured to periodically destage the data from batches of the host write IO operations on the corresponding set of related storage volumes from the allocated slots of shared global memory to backend storage resources;
   wherein destaging the host write IO operations comprises, by each write destage pipeline:
   creating successive batches of host IO write operations on the set of related storage volumes, each batch of host IO write operations including a respective plurality of the host write IO operations on the set of related storage volumes that are received from the host during a respective capture cycle of the write destage pipeline and subsequently processed together to be destaged from the allocated slots of shared global memory to the backend storage resources during an apply cycle of the write destage pipeline;
   capturing a current respective set of received host IO write operations during a current capture cycle, the capture cycle having a duration equal to a duration of a current apply cycle, the current apply cycle containing a respective set of a plurality of previous host IO write operations that were received during a previous capture cycle; and
   performing anomaly detection on the respective set of the plurality of previous host IO write operations on the set of related storage volumes during a first portion of the current apply cycle to determine whether any host IO write operation of the respective set of the plurality of previous host IO write operations on the set of related storage volumes is anomalous;
   in response to a determination that none of the host IO write operations of the respective set of the plurality of previous host IO write operations on the set of related storage volumes is anomalous, destaging the set of previous host IO write operations on the set of related storage volumes to back-end storage resources, ending the current apply cycle after all of the respective set of the plurality of previous host IO write operations on the set of related storage volumes have been destaged to back-end storage resources, and implementing a cycle switch in the write destage pipeline to cause the current respective set of host IO write operations received during the current capture cycle to become the current apply cycle; and
   in response to a determination that one or more of the host IO write operations of the respective set of the plurality of previous host IO write operations is anomalous, not destaging any of the host IO write operations of the respective set of the plurality of previous host IO write operations to back-end storage resources and generating a ransomware activity alert;
   receiving a host IO read operation;
   determining that a first version of the data requested in the host IO read operation resides in back-end storage resources, that a second version of the data requested in the host IO read operation resides in a first slot of global memory referenced by a host IO write operation in the current apply cycle, and that a third version of the data requested in the host IO read operation resides in a second slot of global memory referenced by a host IO write operation in the current apply cycle;
   retrieving the first version of the data requested in the host IO read operation from the back-end storage resources;
   merging the second version of the data requested in the host IO read operation with the first version of the data to create a first merged version of the data; and
   merging the third version of the data requested in the host IO read operation with the first merged version of the data to create a second merged version of the data to be sent to the host in response to the host IO read operation.

2. The method of claim 1, further comprising:
   receiving a response to the ransomware activity alert confirming that the one or more of the host IO write operations of the set of previous host IO write operations that was determined to be anomalous is associated with a ransomware attack; and
   not destaging any of the host IO write operations of the write destage pipeline.

3. The method of claim 2, wherein not destaging any of the host IO write operations of the write destage pipeline comprises discarding all host IO write operations in both the current capture cycle and the current apply cycle of the pipeline.

4. The method of claim 3, further comprising instructing a host to replay all of the discarded host IO write operations.

5. The method of claim 1, further comprising:
   receiving a response to the ransomware activity alert confirming that the one or more of the host IO write operations of the set of previous host IO write operations that was determined to be anomalous is not associated with a ransomware attack; and resuming apply cycle processing, including destaging the set of previous host IO write operations to back-end storage resources, ending the current apply cycle after all of the host IO write operations have been destaged to back-end storage resources, and implementing a cycle switch in the write destage pipeline to cause the current capture cycle to become the current apply cycle.

6. The method of claim 1, wherein the plurality of separate write destage pipelines execute asynchronously relative to each other.

7. A method of data protection by delayed ordered write destage operations, comprising:
  implementing a write destage pipeline by creating batches of host IO write operations, each batch of host IO write operations being captured during a capture cycle of the write destage pipeline and subsequently processed to be destaged during an apply cycle of the write destage pipeline;
  capturing host IO write operations during a current capture cycle, the capture cycle having a duration equal to a duration of a current apply cycle, the current apply cycle containing a set of previous host IO write operations that were captured during a previous capture cycle; and
  performing anomaly detection on the set of previous host IO write operations during a first portion of the current apply cycle to determine whether any host IO write operation of the set of previous host IO write operations is anomalous;
  in response to a determination that none of the host IO write operations of the set of previous host IO write operations is anomalous, destaging the set of previous host IO write operations to back-end storage resources, ending the current apply cycle after all of the host IO write operations have been destaged to back-end storage resources, and implementing a cycle switch in the write destage pipeline to cause the current capture cycle to become the current apply cycle; and
  in response to a determination that one or more of the host IO write operations of the set of previous host IO write operations is anomalous, not destaging the host IO write operations of the set of previous host IO write operations to back-end storage resources and generating a ransomware activity alert;
  receiving a host IO read operation;
  determining that a first version of the data requested in the host IO read operation resides in back-end storage resources, that a second version of the data requested in the host IO read operation resides in a first slot of global memory referenced by a host IO write operation in the current apply cycle, and that a third version of the data requested in the host IO read operation resides in a second slot of global memory referenced by a host IO write operation in the current apply cycle;
  retrieving the first version of the data requested in the host IO read operation from the back-end storage resources;
  merging the second version of the data requested in the host IO read operation with the first version of the data to create a first merged version of the data; and
  merging the third version of the data requested in the host IO read operation with the first merged version of the data to create a second merged version of the data to be sent to the host in response to the host IO read operation.

8. The method of claim 1, wherein a duration of the first portion of the current apply cycle is sufficiently long to enable anomaly detection to be completed on all host IO write operations of the set of previous host IO write operations before destaging any host IO write operations of the set of previous host IO write operations to back-end storage resources.

9. The method of claim 1, further comprising starting anomaly detection processing on at least a portion of the set of previous host IO write operations of the current apply cycle during a previous capture cycle.

10. A system for data protection by delayed ordered write destage operations, comprising:
  one or more processors and one or more storage devices storing instructions that are operable, when executed by the one or more processors, to cause the one or more processors to perform operations comprising:
  receiving host write Input/Output (IO) operations;
  allocating a respective slot of shared global memory for each received host write IO operation and temporarily storing data of each respective host write IO operation in the respective allocated slot of shared global memory; and
  implementing a set of write destage pipelines, each respective write destage pipeline being implemented for a respective set of related storage volumes of a given storage group, and each write destage pipeline being configured to periodically destage the data from batches of the host write IO operations on the corresponding set of related storage volumes from the allocated slots of shared global memory to backend storage resources;
  wherein destaging the host write IO operations comprises, by each write destage pipeline:
  creating successive batches of host IO write operations on the set of related storage volumes, each batch of host IO write operations including a respective plurality of the host write IO operations on the set of related storage volumes that are received from the host during a respective capture cycle of the write destage pipeline and subsequently processed together to be destaged from the allocated slots of shared global memory to the backend storage resources during an apply cycle of the write destage pipeline;
  capturing a current respective set of received host IO write operations during a current capture cycle, the capture cycle having a duration equal to a duration of a current apply cycle, the current apply cycle containing a respective set of a plurality of previous host IO write operations that were received during a previous capture cycle; and
  performing anomaly detection on the respective set of the plurality of previous host IO write operations on the set of related storage volumes during a first portion of the current apply cycle to determine whether any host IO write operation of the respective set of the plurality of previous host IO write operations on the set of related storage volumes is anomalous;
  in response to a determination that none of the host IO write operations of the respective set of the plurality of previous host IO write operations on the set of related storage volumes is anomalous, destaging the set of previous host IO write operations on the set of related storage volumes to back-end storage resources, ending the current apply cycle after all of the respective set of the plurality of previous host IO write operations on the set of related storage volumes have been destaged to back-end storage resources, and implementing a cycle switch in the write destage pipeline to cause the current respective set of host IO write operations received during the current capture cycle to become the current apply cycle; and in response to a determination that one or more of the host IO write operations of the respective set of the plurality of previous host IO write operations is anomalous, not destaging any of the host IO write operations of the respective set of the plurality of previous host IO write operations to back-end storage resources and generating a ransomware activity alert;

receiving a host IO read operation;

determining that a first version of the data requested in the host IO read operation resides in back-end storage resources, that a second version of the data requested in the host IO read operation resides in a first slot of global memory referenced by a host IO write operation in the current apply cycle, and that a third version of the data requested in the host IO read operation resides in a second slot of global memory referenced by a host IO write operation in the current apply cycle;

retrieving the first version of the data requested in the host IO read operation from the back-end storage resources;

merging the second version of the data requested in the host IO read operation with the first version of the data to create a first merged version of the data; and merging the third version of the data requested in the host IO read operation with the first merged version of the data to create a second merged version of the data to be sent to the host in response to the host IO read operation.

11. The system of claim 10, wherein the instructions are further operable, when executed by the one or more processors, to cause the one or more processors to perform operations comprising:

receiving a response to the ransomware activity alert confirming that the one or more of the host IO write operations of the set of previous host IO write operations that was determined to be anomalous is associated with a ransomware attack; and not destaging any of the host IO write operations of the write destage pipeline.

12. The system of claim 11, wherein not destaging any of the host IO write operations of the write destage pipeline comprises discarding all host IO write operations in both the current capture cycle and the current apply cycle of the pipeline.

13. The system of claim 12, wherein the instructions are further operable, when executed by the one or more processors, to cause the one or more processors to perform operations comprising instructing a host to replay all of the discarded host IO write operations.

14. The system of claim 10, wherein the instructions are further operable, when executed by the one or more processors, to cause the one or more processors to perform operations comprising:

receiving a response to the ransomware activity alert confirming that the one or more of the host IO write operations of the set of previous host IO write operations that was determined to be anomalous is not associated with a ransomware attack; and resuming apply cycle processing, including destaging the set of previous host IO write operations to back-end storage resources, ending the current apply cycle after all of the host IO write operations have been destaged to back-end storage resources, and implementing a cycle switch in the write destage pipeline to cause the current capture cycle to become the current apply cycle.

15. The system of claim 10, wherein the plurality of separate write destage pipelines execute asynchronously relative to each other.

16. The system of claim 10, wherein a duration of the first portion of the current apply cycle is sufficiently long to enable anomaly detection to be completed on all host IO write operations of the set of previous host IO write operations before destaging any host IO write operations of the set of previous host IO write operations to back-end storage resources.

17. The system of claim 10, wherein the instructions are further operable, when executed by the one or more processors, to cause the one or more processors to perform operations comprising starting anomaly detection processing on at least a portion of the set of previous host IO write operations of the current apply cycle during a previous capture cycle.

* * * * *